United States Patent
Soatti et al.

(10) Patent No.: US 10,399,638 B2
(45) Date of Patent: Sep. 3, 2019

(54) HOMOKINETIC MOTORCYCLE TRANSMISSION AND MOTORCYCLE COMPRISING SAID TRANSMISSION

(71) Applicant: PIAGGIO & C. S.p.A., Pontedera, Pisa (IT)

(72) Inventors: Piero Soatti, Pisa (IT); Massimiliano Boschiero, Pisa (IT)

(73) Assignee: PIAGGIO & C. S.P.A., Pontedera, Pisa (IT)

(*) Notice: Subject to any disclaimer, the term of this patent is extended or adjusted under 35 U.S.C. 154(b) by 556 days.

(21) Appl. No.: 15/036,349

(22) PCT Filed: Oct. 10, 2014

(86) PCT No.: PCT/IB2014/065213
§ 371 (c)(1),
(2) Date: May 12, 2016

(87) PCT Pub. No.: WO2015/071789
PCT Pub. Date: May 21, 2015

(65) Prior Publication Data
US 2016/0280329 A1    Sep. 29, 2016

(30) Foreign Application Priority Data

Nov. 14, 2013  (IT) .............................. PD2013A0309

(51) Int. Cl.
*F16H 1/14*       (2006.01)
*B62M 17/00*    (2006.01)
(Continued)

(52) U.S. Cl.
CPC ............... *B62M 17/00* (2013.01); *F16D 3/06* (2013.01); *F16D 3/22* (2013.01); *F16D 3/223* (2013.01); *F16H 1/125* (2013.01); *F16H 1/14* (2013.01)

(58) Field of Classification Search
CPC .. B62M 17/00; F16D 3/06; F16D 3/22; F16D 3/223; F16H 1/125; F16H 1/14
See application file for complete search history.

(56) References Cited

U.S. PATENT DOCUMENTS 5,067,580 A * 11/1991 Parker .................. B62K 25/005
                                                                    180/219
5,263,549 A * 11/1993 Dick ....................... B62M 17/00
                                                                    180/226
(Continued)

FOREIGN PATENT DOCUMENTS

CN       1648481 A       8/2005
CN       1918394 A       2/2007
(Continued)

OTHER PUBLICATIONS

International Search Report for corresponding International Patent Application No. PCT/IB2014/065213 dated Feb. 3, 2015.
(Continued)

*Primary Examiner* — David M Fenstermacher
(74) *Attorney, Agent, or Firm* — Merchant & Gould P.C.

(57) ABSTRACT

A motorcycle transmission includes a swingarm which extends from one hinging end to a motorcycle chassis, defining an oscillation axis, at one connection end to a wheel, a homokinetic joint arranged on the side of the hinging end, and a geared coupling positioned on the side of the connection end. The homokinetic joint kinematically reciprocally connects a first end of an input shaft, connected to a power take-off, and a second end of an output shaft mechanically connected to the geared coupling. The geared coupling transmits motion to the wheel. The homokinetic joint performs an instantaneously constant transmission ratio between the first and the second end. The homokinetic joint is offset to the hinging end of the swingarm, in a vertical direction perpendicular to the support surface of the
(Continued)

wheel and permits oscillation of the output shaft between a stroke start and a stroke end, parallel to the oscillation axis.

16 Claims, 3 Drawing Sheets

(51) Int. Cl.
*F16D 3/223* (2011.01)
*F16D 3/06* (2006.01)
*F16D 3/22* (2006.01)
*F16H 1/12* (2006.01)

(56) References Cited

U.S. PATENT DOCUMENTS

| | | | | |
|---|---|---|---|---|
| 6,467,565 B1* | 10/2002 | Handa | ............... | B60K 17/22 |
| | | | | 180/383 |
| 7,971,674 B2 | 7/2011 | Nimura et al. | | |
| 8,002,068 B2 | 8/2011 | Nimura et al. | | |
| 8,297,398 B2* | 10/2012 | Nimura | ............... | B62M 17/00 |
| | | | | 180/226 |
| 8,453,782 B2* | 6/2013 | Kondo | ............... | B62M 7/12 |
| | | | | 180/226 |
| 2004/0140141 A1* | 7/2004 | Soatti | ............... | B62M 17/00 |
| | | | | 180/226 |
| 2007/0199756 A1* | 8/2007 | Kofuji | ............... | B62K 25/283 |
| | | | | 180/226 |
| 2007/0199761 A1* | 8/2007 | Seki | ............... | B62K 5/01 |
| | | | | 180/312 |
| 2008/0006464 A1* | 1/2008 | Utsumi | ............... | B62K 25/26 |
| | | | | 180/226 |
| 2009/0236168 A1* | 9/2009 | Nimura | ............... | B62K 25/283 |
| | | | | 180/348 |
| 2010/0078250 A1* | 4/2010 | Nimura | ............... | B62K 25/283 |
| | | | | 180/226 |

FOREIGN PATENT DOCUMENTS

| | | |
|---|---|---|
| CN | 1939802 A | 4/2007 |
| DE | 10246019 A1 | 7/2003 |
| EP | 1361149 A1 | 11/2003 |
| JP | S60-029387 A | 2/1985 |
| JP | 2003-113855 A | 4/2003 |
| JP | 2003-118675 A | 4/2003 |
| JP | 2008-230382 A | 10/2008 |
| KR | 900002148 B1 | 4/1990 |

OTHER PUBLICATIONS

Chinese Search Report for corresponding Chinese Patent Application No. 2014800620093, dated Mar. 28, 2018, 1 pg.
Japanese Search Report for corresponding Japanese Patent Application, dated Apr. 24, 2018, 1 pg.
Taiwanese Search Report for corresponding Taiwanese Patent Application No. 103138072, dated Aug. 10, 2017, 1 pg.

* cited by examiner

HOMOKINETIC MOTORCYCLE TRANSMISSION AND MOTORCYCLE COMPRISING SAID TRANSMISSION

This application is a National Stage Application of PCT/IB2014/065213, filed 10 Oct. 2014, which claims benefit of Serial No. PD2013A000309, filed 14 Nov. 2013 in Italy, and which applications are incorporated herein by reference. To the extent appropriate, a claim of priority is made to each of the above disclosed applications.

FIELD OF APPLICATION

The present invention relates to a homokinetic motorcycle transmission and to a motorcycle comprising said transmission.

BACKGROUND ART

As is known, the motion transmission in the motorcycle field usually takes place by means of a pinion-chain-crown group (moving from the crankshaft to the rear wheel, respectively), or by means of a cardan-type joint.

The advantage of the first solution consists in the fact that it carries out a transmission instantaneously homokinetic, therefore comfortable, reliable and at a relatively low cost. Moreover, such a transmission is also very light. The drawback essentially consists in that the chain transmission requires continuous maintenance (in terms of cleaning and lubrication) and in that it has a quite limited duration over time due to wear of the chain and/or the teeth of the pinion or crown.

The cardan joint transmission has the advantage of being virtually maintenance free (it being housed in a casing in an oil or grease bath); however, such a transmission is much heavier and more expensive. Moreover, such a transmission is on the average but not instantaneously homokinetic due to the fact that the transmission ratio between the shafts connected by the coupling has a sinusoidal pattern over time: this entails a non-optimum comfort for the user.

In addition, the cardan joint transmission implies a further limitation consisting in the relative position between the centre of the universal cardan joint and the hinging axis of the rear swingarm which must match: the matching in fact allows the oscillation of the swingarm itself. This geometric constraint is strongly limiting since it imposes a squat angle value that considerably determines the dynamic behaviour of the vehicle in terms of load transfer and the work of the rear suspension.

To overcome the latter limitation, it is known from U.S. Pat. No. 7,971,674 to provide a transmission that includes, in series, a cardan joint (kinematically connected to the motor shaft) and a homokinetic joint kinematically connected to the rear wheel. The homokinetic joint allows an axial sliding between the axles connected thereto, always ensuring their integral (and homokinetic) rotation. In this way, it is possible to misalign the centre of the cardan joint with respect to the hinging point of the swingarm: in fact, the rotation of the swingarm is allowed by the axial sliding of the homokinetic joint. In this way, the limitation of the squat angle is overcome and the dynamic behaviour of the vehicle can be modified as desired. On the other hand, however, this solution has the drawback of both the cost/weight due to the presence of the cardan joint and the problem that the transmission is not instantly homokinetic. In fact, the 'sinusoidal oscillations' due to the cardan joint are always present and are rigidly transmitted by the homokinetic joint.

DISCLOSURE OF THE INVENTION

The need of solving the drawbacks and limitations mentioned with reference to the prior art is therefore felt.

In other words, the need is felt to provide a transmission alternative to the chain-pinion-crown kinematic mechanism, which is instantly homokinetic and which does not involve limitations on the geometry/kinematics of the swingarm and/or excessive costs/weights.

DESCRIPTION OF THE DRAWINGS

Further features and the advantages of the present invention will appear more clearly from the following description of preferred non-limiting embodiments thereof, in which.

Elements or parts of elements in common between the embodiments described below are referred to with the same reference numerals.

DETAILED DESCRIPTION

Figure 1:
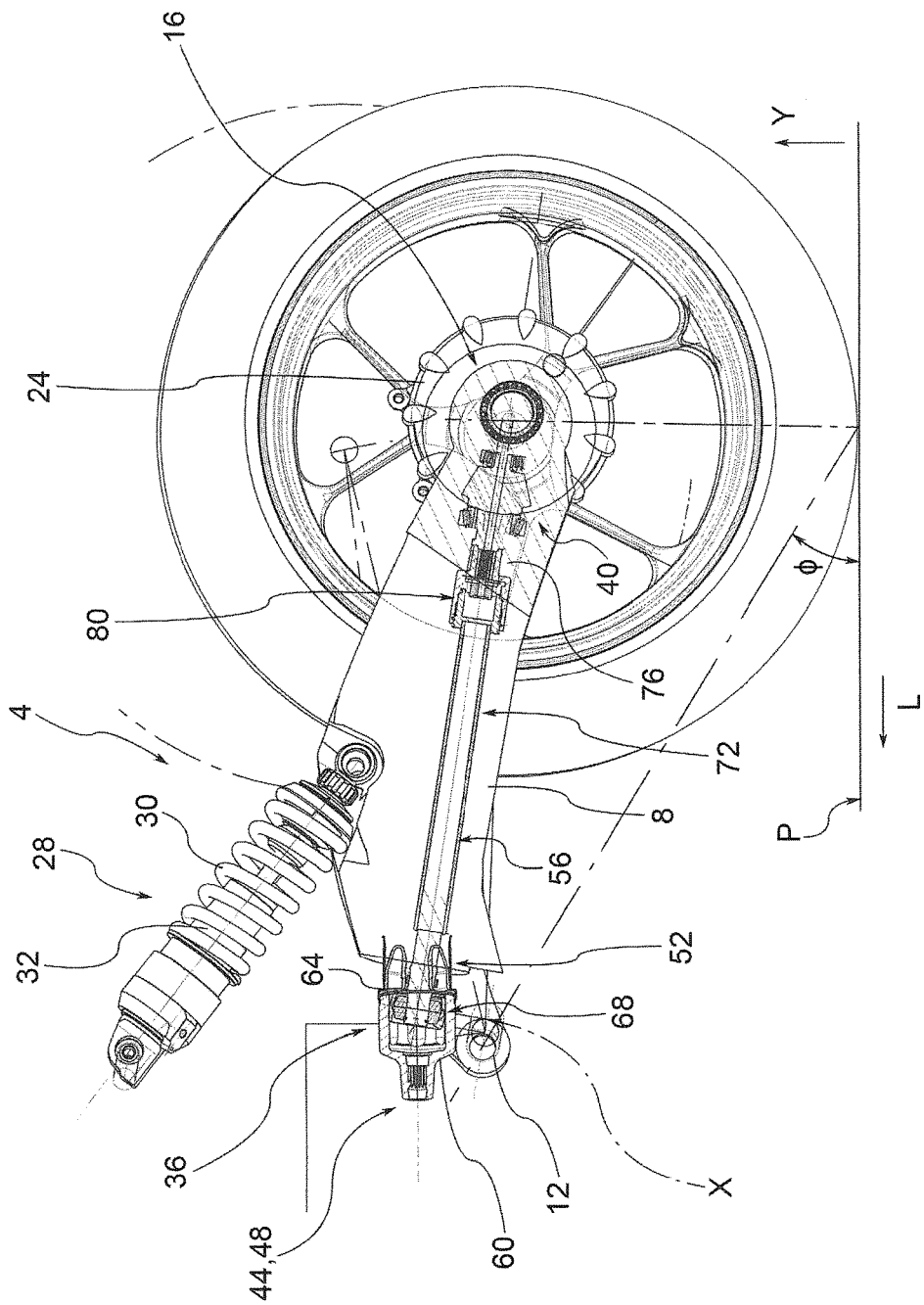
FIG. 1 shows a lateral, partly sectional view of a motorcycle transmission according to the present invention.

With reference to the above figures, reference numeral 4 globally indicates a motorcycle transmission according to the present invention, applied to the rear axle of a motorcycle.

For the purposes of this invention, it should be noted that the term motorcycle must be considered in a broad sense, encompassing any motor cycle having at least two wheels, i.e. one front wheel and one rear wheel. Therefore, this definition also includes three-wheel motorcycles, such as two paired and steering wheels on the front end and one driving wheel at the rear, but also motorcycles that include only one wheel, steering, on the front end and two driving wheels at the rear. Finally, the definition of motorcycle also includes the so-called quads, with two wheels at the front end and two wheels at the rear end.

The motorcycle transmission 4 according to the present invention comprises a swingarm 8 which extends from a hinging end 12 to an associable motorcycle chassis (not shown), defining an oscillation axis X-X, to a connection end 16 to a wheel 20.

For the purposes of the present invention, swingarm 8 may have any shape, size and may for example be of the lattice type, the box-like type, die-cast, and so on.

In particular, swingarm 8 may be either single-arm or two-arm.

The hinging end 12 may be hinged to the chassis via the interposition of bushes in a known manner.

The connection end 16 typically supports a hub 24 of wheel 20.

Typically, at least one shock absorber assembly 28 is interposed between the chassis and the swingarm, comprising at least one spring 30 and at least one shock absorber 32 so as to allow a relative rotation of swingarm 8 with respect to the chassis, about the hinging end 12 and the oscillation axis X-X.

Transmission 4 further comprises a homokinetic joint 36 positioned on the side of the hinging end 12, and a geared coupling 40 positioned on the side of the connection end 16.

The homokinetic joint 36 kinematically connects to each other a first end 44 of an input shaft 48, connected to a power take-off (such as the output pinion of the drive shaft), and a second end 52 of an output shaft 56 mechanically connected to the geared coupling 40.

The geared coupling 40 in turn transmits the motion to wheel 20; for example, the geared coupling 40 comprises of the second end comprises a pair of conical or spiral bevel gears.

Advantageously, the homokinetic joint 36 performs an instantaneously constant transmission ratio between the first and the second end, and thus between the input shaft 48 and the output shaft 56.

The homokinetic joint 36 is offset to the hinging end 12 of swingarm 8, in a vertical direction Y-Y perpendicular to the support surface P of wheel 20 and permits an oscillation of the output shaft 56 between a stroke start and a stroke end, parallel to said oscillation axis X-X.

Figure 2:
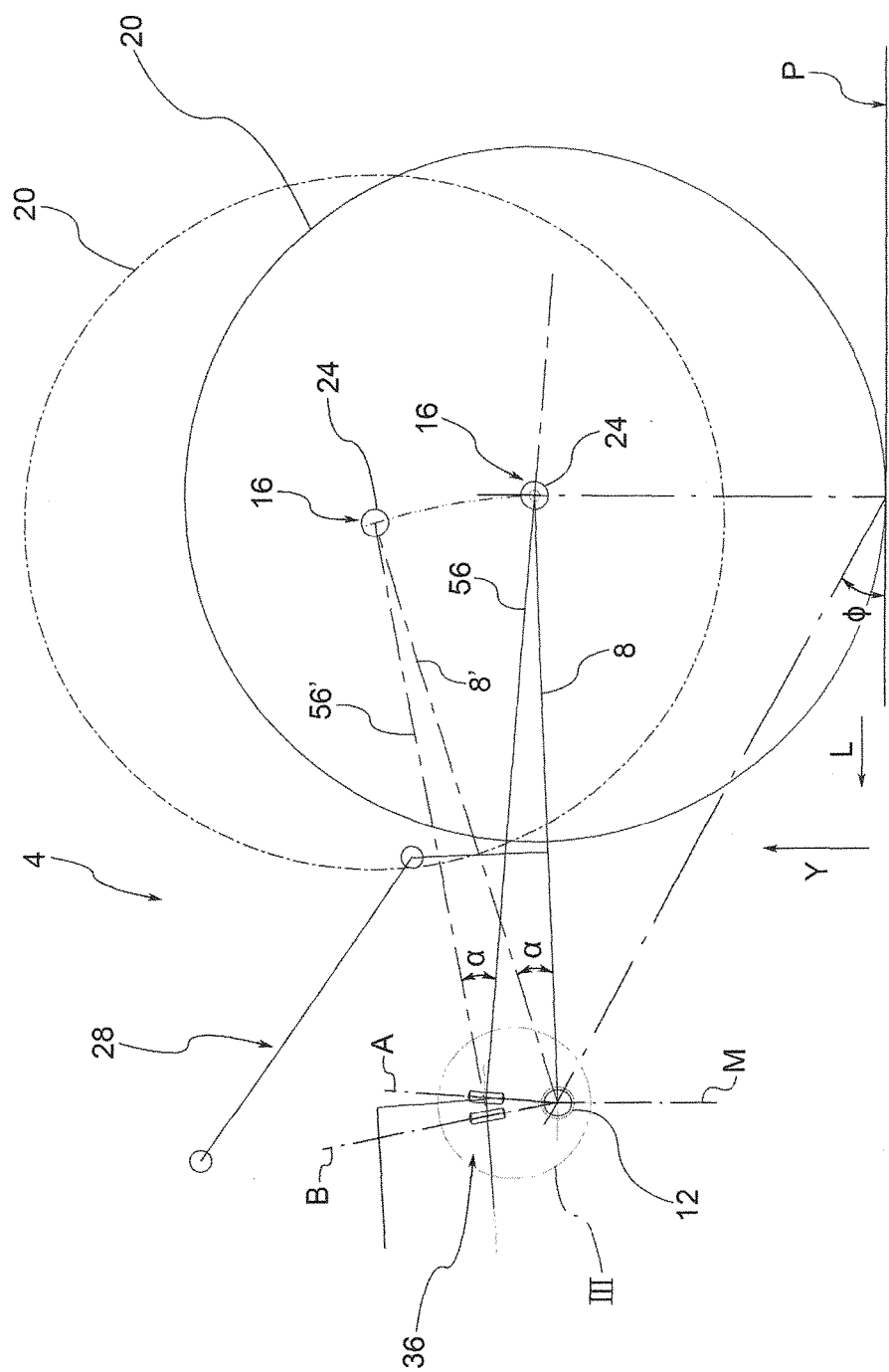
FIG. 2 shows a functional schematic view of the motorcycle transmission in FIG. 1.
Figure 3:
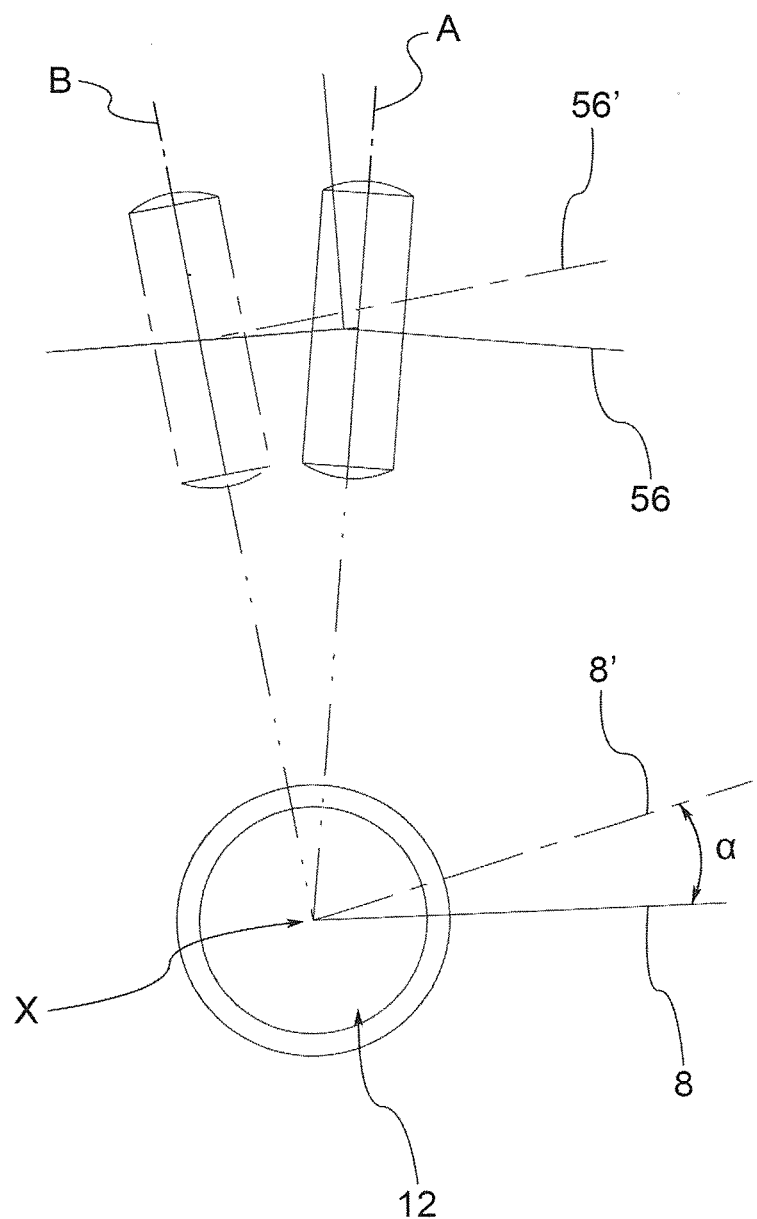
FIG. 3 shows the enlarged detail III in FIG. 2.

The oscillation of the output shaft 56 is shown in FIGS. 2-3 by an angle α.

The stroke end positions are shown in FIG. 2 with a solid line and a dashed line, respectively.

For better understanding, the references of swingarm 8 and the output shaft 56 are indicated with the apex 8', 56' respectively in the stroke end positions.

Therefore, swingarm 8 and the output shaft 56 are indicated with reference numerals 8' and 56' following the rotation of the shaft by said angle α.

Usually, the stroke start and end positions respectively correspond to the maximum extension and maximum compression of the shock absorber assembly 28.

By offset of the homokinetic joint 36 relative to the hinging end 12 along the vertical direction Y- it is meant that the joint and the hinging end are at different heights or distances from the support plane P, with respect to the vertical direction Y-Y.

Thanks to this misalignment, it is possible to release the position of the homokinetic joint 36 from that hinging end 12, and therefore the squat angle Φ of the transmission may be changed with greater freedom by suitably varying the position of the hinging end 12.

By squats angle it is meant, by convection, the angle between the ground line L and the straight line joining the point of contact of the wheel with the ground with the oscillation axis X-X of swingarm 8.

According to a possible embodiment, the homokinetic joint 36, in relation to the line joining the hinging end 12 and the connection end 16 of swingarm 8, finds itself in the half plane opposite the support surface P of wheel 20, so as to be offset in relation to the hinging end 12 in a vertical direction Y-Y.

According to a possible embodiment, the homokinetic joint 36 is offset in relation to the hinging end 12 to an associable motorcycle chassis, in a longitudinal direction L-L, perpendicular to the oscillation axis X-X and to the vertical direction Y-Y.

Preferably, the homokinetic joint 36 is positioned astride a centreline plane M-M passing through the hinging end 12 and parallel to the vertical direction Y-Y.

For example, the homokinetic joint 36 may be positioned symmetrically with respect to said centreline plane M-M passing through the hinging end 12 and parallel to the vertical direction Y-Y.

According to an embodiment, the homokinetic joint 36 is shaped in such a way that straight lines A, B perpendicular to the second end 52 of the output shaft 56 at the start stroke and end stroke positions of the output shaft 56 intersect at the hinging end 12 of swingarm 8 (FIG. 2). In other words, said straight lines A, B perpendicular to the second end 52 of the output shaft 56 at the stroke start and end positions of the output shaft 56 intersect impacting on the oscillation axis X-X.

In yet other words, the centre of rotation imposed to the output shaft 56 by the homokinetic joint 36 is congruent with the centre of oscillation imposed on swingarm 8 by the hinging end 12.

By 'congruent' it is meant that the two centres of rotation/oscillation impose a rotation of the output shaft 56 and an oscillation of swingarm 8, respectively, without reciprocally obstructing. In particular, the output shaft 56 rotates about its centre of rotation adapting (and therefore not opposing) to the oscillation of the swingarm. Therefore, the kinematics of the joint does not affect/impair in any way the dynamic behaviour of the shock absorber assembly 28 but is limited to follow it.

According to a possible embodiment, the homokinetic joint 36 comprises a first and a second cap 60, 64, wherein the first cap 60 is integrally associated in rotation with the first end 44 of the input shaft 48 and the second cap 64 is integrally associated in rotation with the second end 52 of the output shaft 56.

Caps 60 and 64 are coupled together according to a roto-translatory coupling, so as to form a transmission instantly homokinetic between the input and output shafts 48, 56 to permit the rotation of the output shaft 56 between the stroke start and the stroke end and to permit variations of the distance between the second end 52 of the output shaft 56 and the first end 44 of the input shaft 48.

Preferably, the roto-translatory coupling between caps 60, 64 includes the interposition of balls and rollers to minimise friction.

Such variations of the distance between the second end 52 of the output shaft 56 and the first end 44 of the input shaft 48 permit the correct movement (i.e. oscillation) of swingarm 8 about the oscillation axis X-X; in other words, the overall length of the assembly comprising the input shaft 48 and the output shaft 56 must adapt to the instantaneous rotation of swingarm 8 with respect to the oscillation axis X-X. In this way, the motion transmission and the shock absorber assembly work without mutually obstructing.

For example, the second cap 64 is at least partially inserted in the first cap 60 by means of a vault shaped coupling.

Said vault shaped coupling may comprise a groove 68 for the transmission of the torque between the input shaft 48 and the output shaft 56.

According to a further embodiment of the present invention, the output shaft 56 comprises a first and a second rod 72, 76 connected in series by a sliding joint 80 so as to be able to modify the overall length of said output shaft 56, during the transmission of the movement from the power take-off to wheel 20 or to make up for small misalignments.

For example, said sliding joint 80 is an axial joint of the grooved rectilinear or vaulted type.

Swingarm 8, as seen, may have any shape and size. For example, it may have an overall box-shaped structure that accommodates in its interior, at least partially, the homokinetic joint 36 and in particular the input shaft 48 and the output shaft 56. For example, swingarm 8 is of the single arm type, wherein the single arm houses at least partially the input shaft 48 and/or the output shaft 56.

As can be understood from the description, the motorcycle transmission according to the invention allows overcoming the drawbacks of the prior art.

In particular, the present invention allows obtaining a transmission instantaneously homokinetic and therefore very comfortable, while not providing for the use of the conventional chain.

The transmission is instantly homokinetic since it is completely devoid of cardan joint which, as known, is not homokinetic.

In addition, the transmission is very reliable and essentially maintenance-free, just like a cardan joint transmission.

Furthermore, the transmission of the present invention does not impose specific constraints between the hinging fulcrum of the swingarm and the positioning of the homokinetic joint: it is therefore possible to use the squat angle Φ that is more suitable to the type of motorcycle, and then impose the preferred dynamic behaviour to the motorcycle in terms of load transfer.

The motorcycle transmission is compact and does not impose excessive weight burdens compared to the solutions with chain; the solution is however lighter and less bulky than an equivalent solution with cardan joint.

A man skilled in the art may make several changes and adjustments to the motorcycle transmission described above in order to meet specific and incidental needs, all falling within the scope of protection defined in the following claims.

The invention claimed is:

1. Motorcycle transmission comprising
   a swingarm which extends from a hinging end to an associable motorcycle chassis, defining an oscillation axis, to a connection end to a wheel,
   a homokinetic joint positioned on a side of the hinging end, and a geared coupling positioned on a side of the connection end,
   wherein the homokinetic joint kinematically connects to a first end of an input shaft, connected to a power take-off, and to a second end of an output shaft mechanically connected to said geared coupling, and wherein the geared coupling transmits movement to the wheel,
   wherein
   the homokinetic joint is a single joint and defines an instantaneously constant transmission ratio between said first end and said second end,
   the homokinetic joint is offset to the hinging end of the swingarm, in a vertical direction perpendicular to a support surface of the wheel and permits an oscillation of the output shaft between a stroke start and a stroke end, parallel to said oscillation axis.

2. Motorcycle transmission according to claim 1, wherein the homokinetic joint, in relation to the line joining the hinging end and the connection end of the swingarm is in a half plane opposite the support surface of the wheel, so as to be offset in relation to the hinging end in a vertical direction.

3. Motorcycle transmission according to claim 1, wherein the homokinetic joint is offset in relation to the hinging end to an associable motorcycle chassis, in a longitudinal direction, perpendicular to the oscillation axis and to the vertical direction.

4. Motorcycle transmission according to claim 1, wherein the homokinetic joint is positioned astride a centreline plane passing through the hinging end and parallel to said vertical direction.

5. Motorcycle transmission according to claim 4, wherein the homokinetic joint is positioned symmetrically in relation to a centreline plane passing through the hinging end and parallel to said vertical direction.

6. Motorcycle transmission according to claim 1, wherein the homokinetic joint is shaped in such a way that straight lines perpendicular to the second end of the output shaft at the start stroke position and the end stroke position of the output shaft intersect at the hinging end of the swingarm.

7. Motorcycle transmission according to claim 1, wherein said swingarm comprises a single arm, wherein the single arm houses at least partially the input shaft and/or the output shaft.

8. Motorcycle transmission according to claim 1, wherein said swingarm comprises two arms.

9. Motorcycle transmission according to claim 1, wherein the geared coupling positioned on the side of the second end comprises a pair of conical or spiral bevel gears.

10. Motorcycle comprising a transmission according to claim 1.

11. Motorcycle transmission according to claim 1, wherein the output shaft comprises a first rod and a second rod, connected in series by a sliding joint so as to be able to modify an overall length of said output shaft, during transmission of the movement from the power take-off to the wheel or to make up for small misalignments.

12. Motorcycle transmission according to claim 11, wherein said sliding joint is a grooved and vaulted axial joint.

13. A motorcycle transmission comprising
   a swingarm which extends from a hinging end to an associable motorcycle chassis, defining an oscillation axis, to a connection end to a wheel;
   a homokinetic joint positioned on a side of the hinging end, and a geared coupling positioned on a side of the connection end;
   wherein the homokinetic joint kinematically connects to a first end of an input shaft, connected to a power take-off, and to a second end of an output shaft mechanically connected to said geared coupling, and wherein the geared coupling transmits movement to the wheel;
   wherein the homokinetic joint is a single joint and defines an instantaneously constant transmission ratio between said first end and said second end;
   wherein the homokinetic joint is offset to the hinging end of the swingarm, in a vertical direction perpendicular to a support surface of the wheel and permits an oscillation of the output shaft between a stroke start and a stroke end, parallel to said oscillation axis; and
   wherein the homokinetic joint comprises a first cap and a second cap, wherein the first cap is integrally joined in rotation to the first end of the input shaft and the second cap is integrally joined in rotation to the second end of the output shaft, said caps being coupled by a roto-translatory coupling, so as to form a transmission instantly homokinetic, to permit rotation of the output shaft between the stroke start and the stroke end and to permit variations of a distance between the second end of the output shaft and the first end of the input shaft.

14. Motorcycle transmission according to claim 13, wherein the second cap is at least partially inserted in the first cap by a vault shaped coupling.

15. Motorcycle transmission according to claim 14, wherein said vault shaped coupling comprises a groove for the transmission of torque between the input shaft and the output shaft.

16. Motorcycle transmission according to claim 13, wherein the roto-translatory coupling between the caps comprises interposition of balls and rollers to reduce friction of the coupling to a minimum.

\* \* \* \* \*

UNITED STATES PATENT AND TRADEMARK OFFICE
CERTIFICATE OF CORRECTION

PATENT NO. : 10,399,638 B2
APPLICATION NO. : 15/036349
DATED : September 3, 2019
INVENTOR(S) : Soatti et al.

Page 1 of 1

It is certified that error appears in the above-identified patent and that said Letters Patent is hereby corrected as shown below:

On the Title Page

(30) Foreign Application Priority Data: "Nov. 14, 2013 (IT) PD2013A0309" should read -- Nov. 14, 2013 (IT) PD2013A000309 --

Signed and Sealed this
Third Day of December, 2019

Andrei Iancu
*Director of the United States Patent and Trademark Office*